United States Patent [19]

Holmes

[11] 4,095,956
[45] Jun. 20, 1978

[54] WASTE PROCESSING SYSTEM

[75] Inventor: William H. Holmes, Fayetteville, N.Y.

[73] Assignee: Holmes Bros., Inc., Syracuse, N.Y.

[21] Appl. No.: 703,270

[22] Filed: Jul. 7, 1976

[51] Int. Cl.² .................... B30B 11/00; C10L 5/22
[52] U.S. Cl. .......................... 44/13; 44/1 D; 44/2
[58] Field of Search ........... 44/1 D, 1 R, 10 A, 10 G, 44/2, 11–13

[56] References Cited

U.S. PATENT DOCUMENTS

| 1,312,173 | 8/1919 | Gerlach et al. | 44/2 |
| 2,014,796 | 9/1935 | Blumenthal et al. | 44/12 |
| 2,270,288 | 1/1942 | Goss | 44/10 A |

FOREIGN PATENT DOCUMENTS

| 1,286,532 | 8/1972 | United Kingdom | 44/10 A |

Primary Examiner—Carl F. Dees

Attorney, Agent, or Firm—Bruns & Jenney

[57] ABSTRACT

A waste to fuel processing system wherein solid municipal waste is converted to usable industrial fuel. The waste is deposited in a relatively large "pick" or receiving pit having mechanical means for removing very bulky, outsized material. The remaining waste is delivered by conveyor to a first rotating trommel having holes that are at least one foot in diameter. Combustible material over a foot in diameter which is rejected by the first trommel is reduced by coarse shredding and remixed with the other combustibles at the packaging apparatus. Material that passes through the holes of the trommel is delivered by conveyor to a second rotating trommel having holes that do not exceed 2.5 inches in diameter. In the second trommel, frangible material along with small stones and dirt drops through the holes and the remaining waste is delivered by conveyor to packaging apparatus, such as a baler or compactor, for conditioning it for use as fuel.

6 Claims, 4 Drawing Figures

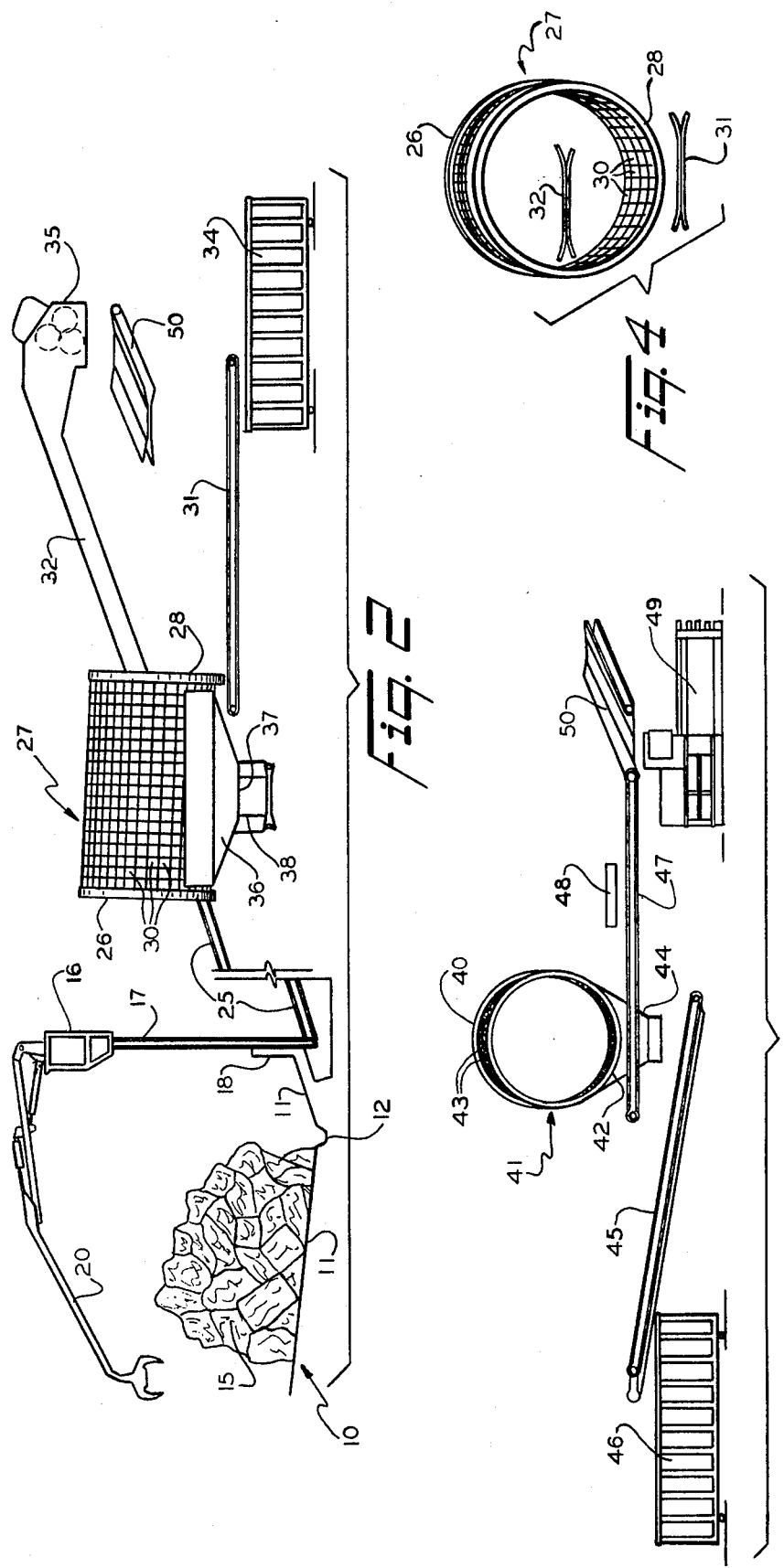

WASTE PROCESSING SYSTEM

BACKGROUND OF THE INVENTION

This invention relates generally to material separating and sorting apparatus, and has particular reference to a novel waste processing system for converting solid municipal waste into usable industrial fuel.

It has been recognized for some time that solid municipal waste — the trash and garbage picked up by city route trucks and private commercial haulers — is an accepted, viable source of energy. The waste when used as fuel provides a partial solution to the search for alternative energy sources and, at the same time, provides an advantageous way of disposing of the waste. A number of processes have been previously developed or proposed for recycling solid waste but the great majority of these are so sophisticated and costly that only the larger municipalities can afford them.

SUMMARY OF THE INVENTION

The present invention provides a relatively low cost, practical waste to fuel processing system for producing low grade fuel from municipal waste. Broadly stated, the system removes most of the non-combustible material from the waste and packages the remainder to provide low cost fuel for process heat for local industries. The system thus serves as a supplemental energy source while, at the same time, taking a large step towards solving the waste disposal problem. In this connection, it is calculated that the municipal waste to landfill can be reduced by at least 75%.

Refuse derived fuel systems that have been developed heretofore have generally used density as the primary means of classification, the principal components being shredders followed by air classifiers. The waste processing system of the invention uses size as the primary means of classification, the principal components being a plurality of simple, low energy trommels which are large rotating drum screens.

The waste processing system of the invention includes a large receiving or "pick" pit into which the municipal waste is dumped by the haulers, and wherein a loader under the control of an operator removes outsized objects such as refrigerators, hot water heaters, etc. The loader pulls or "hoes" the rest of the waste onto a conveyor which delivers it to a first rotating trommel having relatively large holes. This trommel breaks open any bags containing trash or garbage and removes such things as large cartons, tires and brush. The large combustible items are reduced by coarse shredding and returned to the system at the packaging apparatus. The waste that drops through the holes of the first trommel is delivered by a conveyor to a second rotating trommel having holes that do not exceed 2.5 inches in diameter. In the second trommel, frangible material along with small stones and dirt drops through the holes and the remaining waste is delivered by conveyor to packaging apparatus, such as a baler or compactor, for conditioning it for use as fuel.

BRIEF DESCRIPTION OF THE DRAWINGS

FIG. 2 is a vertical sectional view of the system taken on line 2—2 of FIG. 1;

FIG. 3 is a side elevation of the system looking from line 3—3 of FIG. 1; and

FIG. 4 is a vertical sectional view of the system taken on line 4—4 of FIG. 1.

DESCRIPTION OF THE PREFERRED EMBODIMENTS

Figure 1:
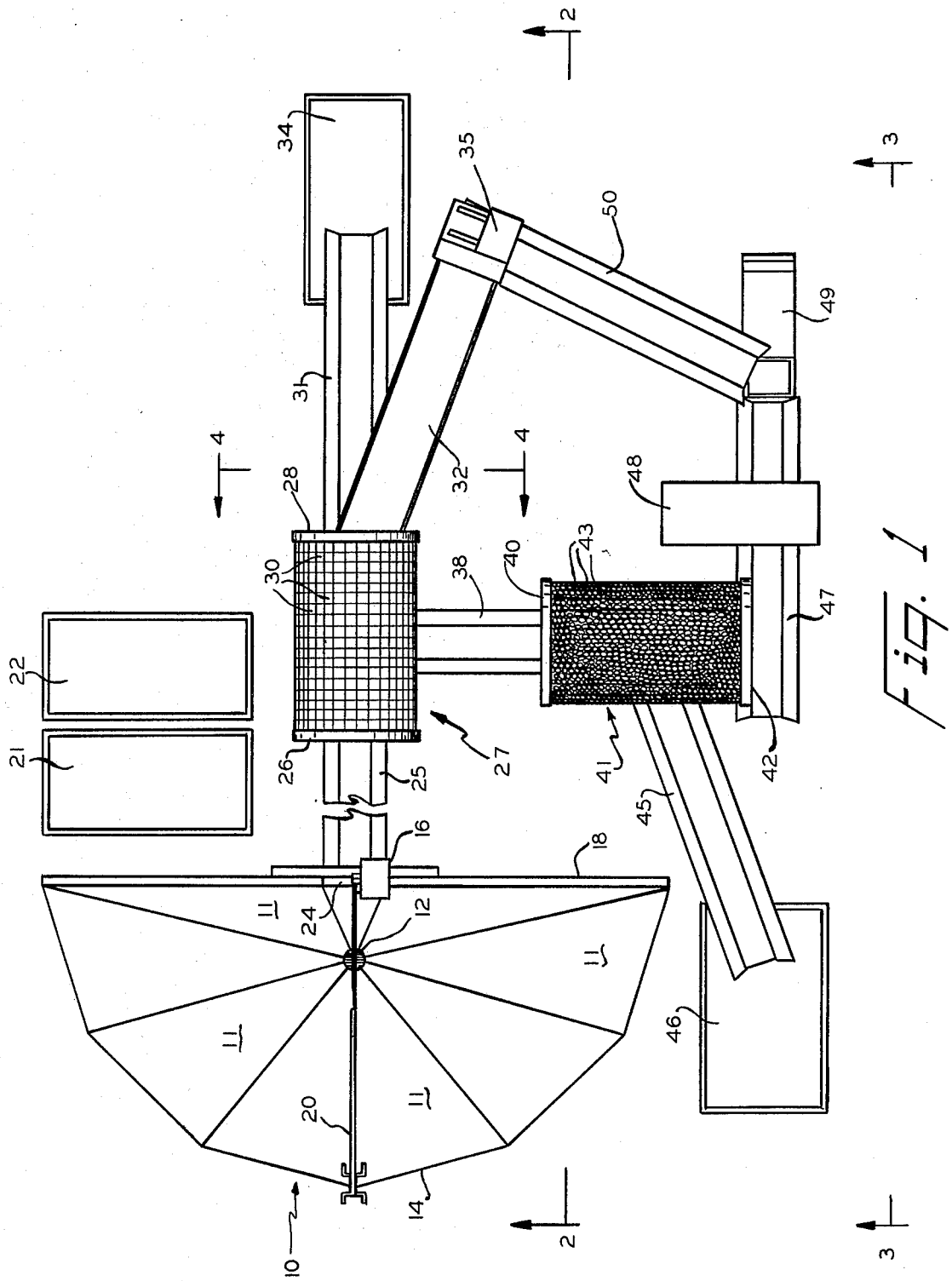
FIG. 1 is a top plan view of a waste processing system embodying the invention, the system being shown schematically.

Referring now to the drawings, and with particular reference to FIGS. 1 and 2, the reference number 10 indicates the "pick" or recieving pit which is a pit or a portion of a dished recess in the ground. As shown, the floor of the pit can be made up of a plurality of paved sectors 11 which slope down to a common low point where there may be a drain 12 to collect liquids. Vehicles loaded with municipal solid waste — trash and garbage — back up to the front edge 14 of the pit and dump the waste into it as indicated at 15 in FIG. 2.

An operator's control station 16 is supported in an elevated position above the pick pit 10 by a suitable pole 17 located adjacent the back wall 18 of the pit. A jawed loader 20 of conventional design is mounted on top of the control station and with this the operator removes from the pile of waste 15 very bulky items such as refrigerators, hot water heaters, pieces of furniture, etc. Outsized metallic items are deposited by the loader in a container 21 and other outsized items are deposited in a container 22.

After the very bulky items have been removed, the loader 20 is used by the operator to pull or "hoe" the rest of waste through an opening 24, FIG. 1, in the back wall 18 of the pit and onto an upwardly inclined conveyor 25. In the process of removing the bulky items and hoeing the waste, the operator has the opportunity to inspect the waste and can detect material of an explosive nature that should also be removed from the waste at the pick pit. The conveyor 25 delivers the waste to the inlet end 26 of a first trommel 27, a large cylindrical screen of the type used in sorting ore or grading stone.

Trommel 27 is rotated by suitable means (not shown) about its longitudinal axis which has a slight downward incline from the inlet end 26 of the trommel to its outlet end 28. The holes or openings 30 formed by the trommel screen are relatively large, preferably being from 12 to 18 inches in diameter. These holes can be round or square and if the latter, the size can range from 12 to 18 inches on a side.

The first rotating trommel 27 operates to break open any plastic or paper bags containing trash and most of the bag contents will pass through the holes of the trommel. The first trommel also diverts the bulky material to facilitate the breaking of the frangible material and the sifting operation of the second trommel, to be described. Waste material too large to pass through the holes of the first trommel is deposited on a conveyor 31, the inner end of which is located below the outlet end 28 of the trommel, FIGS. 1, 2 and 4. The too large but lightweight material, consisting of such things as paper, cardboard and brush, may be lifted upwardly by the rotation of the trommel and deposited on a conveyor 32, the end of which extends into the outlet end 28 of the trommel. Heavier combustible material will have to be manually or otherwise transferred from conveyor 31 to the upper conveyor 32 for further processing to be described.

The heavier, non-combustible material that remains on the lower conveyor 31 is delivered by it to a container 34 for removal for further processing or to landfill. The lighter material deposited on upper conveyor 32 is for the most part combustible and capable of being shredded, and it is delivered by the conveyor to a shredder 35 of conventional design. The waste material that passes through the holes of the first trommel falls into a hopper 36 positioned below the trommel, FIG. 2, and then falls through the hopper outlet 37 onto a downwardly inclined conveyor 38.

The conveyor 38 delivers the waste material, which now includes no items or articles having a dimension larger than 18 inches, to the inlet end 40 of a second rotating trommel 41, the longitudinal axis of which has a slight downward incline from its inlet end to its outlet end 42. In the second trommel, the holes or openings 43 formed by the trommel screen are relatively small, preferably being not more than 2.5 inches in diameter. As with the first trommel, these holes can be round or square.

The lifting and dropping action of trommel 41 operates to break frangible articles such as bottles and dishes into small pieces, and these together with small stones and dirt drop through the holes at the bottom of the trommel into a hopper 44, FIG. 3, and from thence onto a conveyor 45. The conveyor 45 delivers this material to a container 46 for removal to landfill or for further processing. The remaining waste material, most of which is combustible, moves down to the outlet end 42 of the trommel where it drops onto a conveyor 47. Included in the waste material at this point will be food and beverage cans. Steel cans along with other ferrous materials will be separated out by a magnetic conveyor indicated at 48. Copper and aluminum in the waste will remain and become a part of the final fuel product unless it should prove economically feasible to remove them.

The material that is left on conveyor 47 after it has passed beneath the magnetic conveyor is delivered to a conventional horizontal baler 49 which forms or packages it into standard rectangular bales of about 1,000 pounds each. Material that has been shredded by the shredder 35 can also be delivered to the baler for packaging by means of a conveyor 50. A conventional compactor could be substituted for the baler. With the waste processing system described, approximately 70% of the solid waste deposited in the pick pit is baled for use as fuel, approximately 20% of the waste goes to landfill and approximately 5% of the waste is salvaged ferrous metals.

The fuel produced by the system is a low grade, low cost fuel that is best adapted for use as a supplement to other fuels. It has been determined that the average heat content of the fuel is in excess of 6,000 BTU per pound. Preferably the fuel should be used as it is produced because it does not lend itself to extended storage. Industries with a relatively constant need for process heat are the best potential users.

From the foregoing description, it will be apparent that the invention provides a novel waste to fuel processing system which can be built at a reasonable cost using readily available components. The system, moreover, affords an advantageous solution to the municipal waste disposal problem as well as a partial solution to the problem of fuel shortages. As will be understood by those familiar with the art, the invention may be embodied in other specific forms without departing from the spirit or essential characteristics thereof.

I claim:

1. In a waste processing system, a pick pit in which municipal waste is deposited, the pit being a dished receiving area having a substantially continuous bottom surface for temporarily holding the waste, mechanical means for sorting the waste in the pit and removing outsized material therefrom, a first rotating trommel for receiving the remaining waste and removing the bulky material therefrom, the trommel having holes that are at least one foot in diameter, a second rotating trommel for receiving waste that passes through the holes of the first trommel, the second trommel having holes that do not exceed 2.5 inches in diameter, and packaging means for receiving waste that does not pass through the holes of the second trommel and conditioning it for use as fuel.

2. A system as defined in claim 1 wherein the trommels are cylindrical and open-ended, each trommel having an inlet end and an outlet end and having its longitudinal axis inclined so that the inlet end is positioned above the outlet end.

3. A system as defined in claim 2 wherein the waste is delivered to the inlet ends of the trommels and removed from the outlet ends thereof by conveyors.

4. A system as defined in claim 1 wherein the means for sorting the waste in the pick pit is a loader under the control of an operator.

5. In a waste processing system, a pick pit in which municipal waste is deposited, the pit being a dished receiving area having a substantially continuous bottom surface for temporarily holding the waste, mechanical means for sorting the waste in the pit and removing bulky material therefrom, the mechanical means being a loader under the control of an operator, a first rotating open-ended trommel having inlet and outlet ends, conveyor means for delivering the remaining waste in the pick pit to the inlet end of the trommel, the trommel having holes that are at least one foot in diameter, conveyor means at the outlet end of the trommel for carrying away waste that does not pass through its holes, a second rotating open-ended trommel having inlet and outlet ends, conveyor means disposed so as to deliver waste that passes through the holes of the first trommel to the inlet end of the second trommel, the second trommel having holes that do not exceed 2.5 inches in diameter, conveyor means positioned in part below the second trommel for carrying away waste that passes through the holes of the trommel, packaging means for conditioning waste for use as a low grade fuel, and conveyor means for delivering waste that does not pass through the holes of the second trommel to the packaging means.

6. A system as defined in claim 5 wherein the trommels are substantially cylindrical, the longitudinal axis of each trommel being included so that its inlet end is positioned above its outlet end.

* * * * *

UNITED STATES PATENT AND TRADEMARK OFFICE
CERTIFICATE OF CORRECTION

PATENT NO. : 4,095,956
DATED : June 20, 1978
INVENTOR(S) : WILLIAM H. HOLMES

It is certified that error appears in the above-identified patent and that said Letters Patent are hereby corrected as shown below:

Claim 6, Col. 4, line 59, "included" should be -- inclined --.

Signed and Sealed this

Fourteenth Day of November 1978

[SEAL]

Attest:

RUTH C. MASON
Attesting Officer

DONALD W. BANNER
Commissioner of Patents and Trademarks